Jan. 27, 1959 A. REDNISS ET AL 2,871,098
PRODUCTION OF HYDROGEN CHLORIDE AND SULFURIC ACID
Filed July 19, 1955
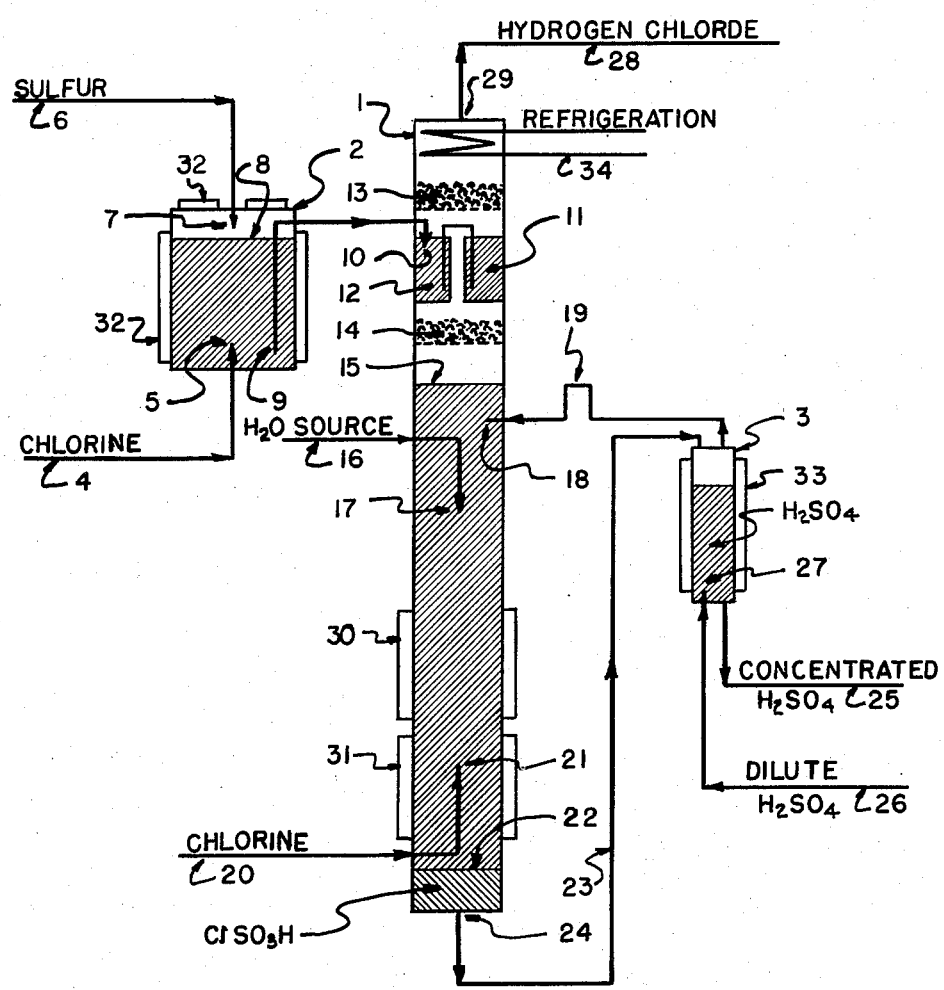
*INVENTOR.*
ALEXANDER REDNISS
SOLOMON GOODMAN
THEODORE CANTOR
BY Morton Amster
ATTORNEY

2,871,098

PRODUCTION OF HYDROGEN CHLORIDE AND SULFURIC ACID

Alexander Redniss and Solomon Goodman, New York, and Theodore Cantor, Yonkers, N. Y., assignors to Technical Enterprises Inc., New York, N. Y., a corporation of New York Application July 19, 1955, Serial No. 523,014

6 Claims. (Cl. 23—156)

This invention relates to the production of hydrogen chloride, and more particularly to the continuous production of a gaseous hydrogen chloride.

Hydrogen chloride is an invaluable chemical and reactant having a multitude of uses in treating, and reacting with, other substances and the like. Many processes have accordingly been proposed for its production, and while a few such processes have been commercially adopted, they are for the most part not entirely satisfactory and are disadvantageous for one reason or aonther. Thus, the production of hydrogen chloride by direct combination of chlorine with hydrogen is known, but requires a source of hydrogen gas which is not always feasible, economically or otherwise. The production of hydrogen chloride by reaction of a strong mineral acid with a chloride salt, or with an aqueous solution of hydrogen chloride are also known; the former process yields a salt of the mineral acid of low economic value as by-product, while the latter yields a diluted mineral acid of low economic value as by-product. There have also been proposed methods for reacting chlorine with water and a reducing agent, but these are for the most part batch processes, yield aqueous solutions of hydrogen chloride, and/or necessitate operation in gaseous or heterogeneous phase.

It is an object of this invention to provide an improved process for the production of gaseous hydrogen chloride. A further object of this invention is the provision of an improved process for simultaneously producing a sulfuric acid and gaseous hydrogen chloride. Other objects and advantages will appear as the description proceeds.

The attainment of the above objects is made possible by the instant invention which comprises continuously admixing and reacting with chlorine and a sulfur containing reducing agent, water at a rate approximately its rate of reaction with said chlorine and reducing agent, and continuously removing gaseous hydrogen chloride and a sulfuric acid from the reaction mixture.

The overall chemical reactions involved in the formation of hydrogen chloride from chlorine, water and a sulfur containing reducing agent are known, and may be depicted as follows:

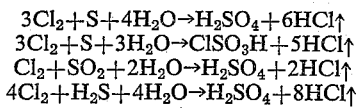

$$3Cl_2 + S + 4H_2O \rightarrow H_2SO_4 + 6HCl\uparrow$$
$$3Cl_2 + S + 3H_2O \rightarrow ClSO_3H + 5HCl\uparrow$$
$$Cl_2 + SO_2 + 2H_2O \rightarrow H_2SO_4 + 2HCl\uparrow$$
$$4Cl_2 + H_2S + 4H_2O \rightarrow H_2SO_4 + 8HCl\uparrow$$

From the above equations, it will be evident that the reactions employed in the instant invention simultaneously yield both a sulfuric acid and hydrogen chloride in varying proportions depending on the particular reducing agent taking part in the reaction, the proportions of reactants, and the like. Although sulfur is the preferred reducing agent for use in the instant invention, it will be seen that use of sulfur dioxide or hydrogen sulfide instead will, if desired, yield relatively higher or lower proportions of the sulfuric acid relative to the hydrogen chloride.

By continuously feeding into the reaction mixture a source of water at a rate approximating its rate of reaction with the other reactants, not only are the obvious advantages of continuity of reaction attained, but in addition a gaseous hydrogen chloride and a concentrated sulfuric acid are produced as compared with prior art processes yielding aqueous solutions of hydrogen chloride and a relatively dilute sulfuric acid. It is to be understood that the term "sulfuric acid" employed herein is intended to also include both oleum and chlorosulfonic acid which are forms of sulfuric acid. As a further feature of this invention, it has been found advantageous to employ as the source of water, hydrocholric or sulfuric acid containing varying amounts of water in admixture or in combination therewith. From this aspect, the process may be regarded as one for upgrading, dehydrating and/or concentrating hydrochloric or sulfuric acids. Thus, when aqueous hydrogen chloride is employed as the source of water, it is dehydrated and the proportion of gaseous hydrogen chloride in the products of the process is correspondingly increased. When a sulfuric acid solution is employed as a source of water, it is dehydrated or concentrated and the proportion of sulfuric acid in the product of the process is correspondingly increased. Even up to 100% sulfuric acid may be employed as the source of water, in which case dehydration thereof during the reaction will yield an oleum as one of the products. Further, by employing an aqueous hydrochloric or sulfuric acid as the source of water, the amount of water reacting in a given volume of reaction mixture at any one time may be more easily controlled and limited to achieve the desired results.

It will be understood that the continuous feed of the source of water referred to herein is inclusive of addition thereof in increments at spaced intervals. In accordance with one embodiment of the invention, the water is introduced, desirably as finely dispersed droplets, into and preferably near the top of the reaction mixture which is maintained at such a temperature and pressure that it remains liquid. Operation in accordance with this embodiment of the invention results in a desirable separation of the reaction products into different phases whereby their recovery is facilitated. Thus, as the water settles in the reaction mixture, it reacts with the sulfur or other reducing agent and the chlorine rising through the reaction mixture to form gaseous hydrogen chloride, which bubbles to the surface and escapes, and chlorosulfonic acid (or sulfuric acid) which settles to the bottom of the reaction mixture as a separate liquid phase. Accordingly, use of a relatively narrow, vertically disposed reaction vessel is advantageous in increasing the length of travel of the reactants and reaction products therethrough, ensuring a more complete reaction.

As the reaction proceeds, the chlorine and reducing agent are depleted and must be replenished. In the preferred embodiment of this invention wherein sulfur is employed as the reducing agent, it has been found advantageous to replenish the reaction mixture by addition thereto of a previously prepared liquid mixture of sulfur and sulfur monochloride, the mixture containing less than one atomic weight of chlorine per one atomic weight of sulfur, and to add the additionally required free chlorine directly to the reaction mixture at or near the bottom thereof. Although the exact ratio of chlorine to sulfur in the reaction mixture at any one time is not critical except in so far as it should fall between about 2 and 30 atomic weights of chlorine per atomic weight of sulfur, their depletion or removal from the reaction mixture takes place at the rate of 6 atomic weights of chlorine per atomic weight of sulfur and they must be substantially continually replenished at rates which average out to this proportion. The chlorine is preferably fed into the lower part of the reaction mixture. In view of the excess chlorine required for the reaction, the sulfur in the reaction mixture will be predominantly in the form of sulfur dichloride, with perhaps a slight amount of sulfur monochloride and no free sulfur. The sulfur monochloride and dichloride in the reaction mixture react to form the desired product in accordance with the following equations:

$$5Cl_2 + S_2Cl_2 + 8H_2O \rightarrow 2H_2SO_4 + 12HCl\uparrow$$

$$2Cl_2 + SCl_2 + 4H_2O \rightarrow H_2SO_4 + 6HCl\uparrow$$

It will of course be understood that the reaction mixture may contain at any particular stage various reaction products intermediate the reactants and the desired final reaction products, such as various oxygen containing sulfurchlorine compounds and the like. However, all of the intermediates react in the presence of water and excess chlorine to form the desired reaction products. In fact, the presence of the said intermediate compounds appears to have an accelerating and generally beneficial effect on the course of the reaction involved in the instant invention. It will accordingly be understood that the term "sulfur" employed herein and in the appended claims to designate the sulfur containing reducing agent in the reaction mixture is intended to include its compounds with chlorine and/or oxygen and the like in which the sulfur is not in its highest state of oxidation. The hydrogen chloride bubbles up to the surface of the reaction mixture and may be drawn off directly as a gaseous hydrogen chloride. The sulfuric acid or chlorosulfonic acid at the bottom of the reaction mixture, present as a separate liquid phase, may likewise be continually drawn off and employed as such or further subjected to purification treatments to remove chlorine and sulfur products, or the like.

Still further advantages of the process of the instant invention are based upon the flexibiblity of control and operation achieved thereby, and the smaller and less expensive pieces of equipment required therefor. It will be apparent that the reaction can be controlled, stopped and/or started again at will merely by controlling or stopping the feed of the source of water. The chlorine and reducing agent feed should of course also be simultaneously controlled to prevent the reaction mass from overflowing and/or being disproportionated.

In another embodiment of this invention, instead of the above described vertical reaction system, the reaction may be carried out in a continuous manner by continuously feeding the reactants (water source, chlorine, and $H_2S$, $SO_2$, S or a liquid mixture of S and $S_2Cl_2$) in substantially stoichiometric ratio into one end of a relatively long reaction vessel maintained under suitable reaction conditions, and separating the gaseous hydrogen chloride and the sulfuric acid reaction products at the other end of the reaction vessel after completion of the reaction therein. The separation is easily accomplished, for example by gravity collection of the liquid sulfuric acid and separate removal of the gaseous hydrogen chloride. In this embodiment, the reaction vessel is preferably a horizontal tubular reactor, although it may of course be of different cross-sectional configuration, inclined from the horizontal, multi-stage, or the like.

Depending upon such factors as the desired rate of reaction, rate and speed of throughput, character of the reducing agent and source of water employed, and the like, it may in some instances be desirable to heat or cool and/or agitate the reaction mixture, and/or to carry out the reaction under pressure. Thus, the attainment of optimum results may in some cases require temperatures of about 90° F. or more, pressures of about two or more atmospheres, application of a vigorous source of agitation and/or injection of one or more of the reactants in atomized or finely divided form and/or under pressure, or the like. The various expedients available for accomplishing same are well known to workers skilled in the art. Similarly, the reaction chamber may be baffled or packed to increase residence time therein and ensure better contact and more complete equilibrium between the reactants. As a still further feature of this invention, it has been found that the effluent hydrogen chloride of the above process may be subjected to a purifying treatment simultaneously with the production of the above described liquid feed mixture of sulfur and sulfur monochloride. This may be accomplished by mixing the effluent gaseous hydrogen chloride with the sulfur and sulfur monochloride mixture previously prepared whereby the said effluent gaseous hydrogen chloride from the main reaction mixture is purified to a substantial extent by removal therefrom of the chlorine and other contaminants contained therein. At the same time the mixture of sulfur and sulfur monochloride is enriched in chlorine content before being introduced into the main reaction mixture. Although the sulfur may be directly introduced, for example in molten or other liquid form, into the reaction mixture, the above described liquid mixture of sulfur and sulfur monochloride is a highly advantageous means for feeding the sulfur into the reaction mixture in view of its liquid nature at ordinary temperatures, thereby avoiding the problems which would arise from the necessity of employing a solid form of sulfur. In the event that insufficient chlorine is carried over in the gaseous hydrogen chloride of the main reaction mixture and absorbed into the mixture of sulfur and sulfur monochloride to liquify all the sulfur, additional free chlorine can be introduced into or mixed with the sulfur-sulfur monochloride mixture to make up for this deficiency. The sulfur monochloride formed is miscible with the chlorine and sulfur over a wide range of composition, thereby facilitating the continuity and flexibility of the procedure.

The effluent gaseous hydrogen chloride may then be employed as such for whatever use it may be put to, or it may be further purified where necessary, in any known manner. The sulfuric acid or chlorosulfonic acid separating at the bottom of the reaction mixture may likewise be removed and employed as such or further purified. If desired, chlorosulfonic acid products may be reacted with dilute sulfuric acid to produce concentrated sulfuric acid and gaseous hydrogen chloride, which latter may be admixed with the gaseous hydrogen chloride from the main reaction mixture.

The attached drawing is a schematic illustration of a system which may be employed in carrying out the embodiment of this invention involving the use of sulfur as the reducing agent for reaction with water and chlorine in a vertically disposed reactor, although the invention is not to be regarded as limited thereto. Reactor 1 is filled at all times to level 15 with a more or less homogeneous mixture of chlorine, sulfur, and/or sulfur chlorides, and may desirably be baffled, or filled with glass marbles or loosely packed glass wool in at least the lower half thereof. It is provided with jackets 30 and 31 for heating or cooling purposes if required. A source of water is introduced through pipe 16 and nozzle 17 into and near the top of the reaction mixture, preferably in the form of finely dispersed droplets.

The chlorine is added to the reaction mixture through pipe 20 and nozzle 21 at the bottom of the reaction mixture. Although the sulfur may be directly added to the reaction mixture, for example in molten form or the like, in the illustration given, the sulfur is first reacted with chlorine to form a solution of sulfur and sulfur monochloride. Thus, in vessel 2, equipped with jackets 32, sulfur in molten form is passed in through pipe 6 and nozzle 7, and chlorine is passed in through pipe 4 and nozzle 5. In this vessel, the sulfur reacts with the chlorine to form sulfur monochloride. The ratio of sulfur to chlorine employed for admixture in vessel 2 is always greater than 1 atomic weight of sulfur per atomic weight of chlorine so that there is always an excess of sulfur. The resulting mixture of sulfur and sulfur monochloride passes from vessel 2 through pipe 9 into the scrubbing section 12. As will be seen, levels 10 and 11 in the scrubbing section are substantially the same as level 8 in vessel 2. Thus, the overflow is automatic, the sulfur and sulfur monochloride mixture flowing from vessel 2 into scrubber 12 of reactor 1 and from thence overflowing into the reaction mixture below. The effluent gaseous hydrogen chloride from the reaction mixture bubbles up through entrainment section 14 formed by means of a wire screen and through the sulfur and sulfur monochloride mixture in the scrubber. In the scrubber, the chlorine contained in the effluent gaseous hydrogen chloride reacts with the excess sulfur in the scrubber to form additional sulfur monochloride. The effluent gaseous hydrogen chloride then bubbles up through the entrainment section 13 formed by means of a second wire screen and through the refrigerated coils 34 whereby substantially all vapors, including chlorine, are condensed except the hydrogen chloride. Entrainment sections 14 and 13 remove liquid particles from the rising vapors. Thus purified gaseous hydrogen chloride is removed through exit 29 and pipe 28.

As described above, the chlorine supplied from vessel 2 as sulfur monochloride is not sufficient to complete the reaction. In fact, it is less than 16% of the chlorine required to oxidize the sulfur to the sulfate stage of oxidation. The rest of the chlorine is therefore added directly to reactor 1 through pipe 20 and nozzle 21, as a liquid or gas, although the pressure in reactor 1 is usually sufficient to compress the gas to a liquid at the operating temperature. Reactor 1 contains an excess of chlorine over that required to oxidize all the sulfur in reactor 1 to the sulfate stage of oxidation. This condition is desirable in that it prevents the formation of sulfur dioxide which would be an undesirable contaminant of the hydrogen chloride. Chlorine is added to reactor 1 continuously or at intervals to maintain an excess. This excess may be maintained by starting with an excess of chlorine in reactor 1, and adding chlorine at a rate such that the total amount of chlorine entering reactor 1 and vessel 2 is related to the sulfur entering vessel 2 according to the ratio of about 6 atomic weights of chlorine to one atomic weight of sulfur, as described above. It should of course be borne in mind that the above mentioned excess of free chlorine in the reaction mixture in reactor 1 should be kept low so that the partial pressure of chlorine over the reaction mixture is low. If all the sulfur is added to reactor 1 as a mixture of sulfur and sulfur monochloride, or as liquid sulfur, to the scrubber 12, the amount of chlorine which is to be scrubbed out of the effluent gaseous hydrogen chloride must be kept within the absorptive capacity of the free sulfur in the scrubber, which is somewhere between 1 and 2 atomic weights of chlorine per atomic weight of sulfur. The same applies to the use of hydrogen sulfide or sulfur dioxide as the reducing agent with even greater force, to minimize the amount of sulfur which is introduced as sulfur or sulfur chloride, and which would enter the reactor through the scrubber 12.

As shown in the drawing, the chlorosulfonic acid forms a separate phase having an interface 22 at the bottom of the reactor 1. The chlorosulfonic acid is removed through exit 24 and pipe 23 and may be employed as such although as illustrated, it is passed into converter 3 equipped with jacket 33 where it is reacted with water in the form of dilute sulfuric acid which is also added into the converter through pipe 26 and nozzle 27. The chlorosulfonic acid is thus converted by reaction with the water in the dilute sulfuric acid to sulfuric acid and gaseous hydrogen chloride. The sulfuric acid thus formed is withdrawn through pipe 25 at the bottom, while the gaseous hydrogen chloride is passed through loop 19 and nozzle 18 into the main reaction mixture in reactor 1 to be admixed with the gaseous hydrogen chloride bubbling up through the scrubber section, entrainment sections, and refrigerating coils.

The following example, in which parts and proportions are by weight unless otherwise indicated, is merely illustrative of one embodiment of the instant invention and is not to be regarded as limitative.

*Example*

Into a vertical, iron tube reactor is charged a mixture of 103 parts of sulfur dichloride and 20 parts of chlorine. The mixture is heated and maintained at 90 deg. C., and pressurized at 150 p. s. i. with hydrogen chloride.

A 90% sulfuric acid solution is injected in the form of finely dispersed droplets into the upper part of the mixture at a rate of about 13.5 parts per hour. As the reaction rate increases, chlorine is injected into the bottom of the reactor at the rate of about 7 parts per hour. 1.8 parts of sulfur, as a liquid mixture of sulfur and sulfur monochloride, per hour is injected into the upper part of the reaction mixture, and hydrogen chloride gas begins to bubble out of the reaction mixture at a rate of about 4 parts per hour. The theoretical yield is about 4.2 parts per hour.

After about 2.5 hours of operation, chlorosulfonic acid forming a separate liquid phase at the bottom of the reactor is continuously withdrawn at a rate of about 21 parts per hour. This is reacted with aqueous sulfuric acid to give about 6 parts of gaseous hydrogen chloride per hour, in addition to more concentrated sulfuric acid. The effluent hydrogen chloride gas withdrawn at the top is scrubbed with a liquid mixture of 135 parts of sulfur monochloride and 30 parts of sulfur. Molten sulfur is added to this scrubbing mixture at the rate of about 1.8 parts per hour, and additional chlorine as required to maintain the mixture liquid. The scrubbed gaseous hydrogen chloride is then purified with a liquid, high boiling aromatic hydrocarbon cooled by ice water, as described in U. S. Patent No. 2,028,087. The scrubbing mixture is continuously fed into the upper part of the reaction mixture at a rate sufficient to provide about 1.8 parts of sulfur per hour.

While the above description has been restricted in its most specific aspects to a process wherein sulfur is employed as the reducing agent, it will be understood that the process of this invention may also be employed with sulfur dioxide or hydrogen sulfide as such reducing agent, with of course appropriate changes in the size or shape of equipment or location of the various feeds, hookups, and/or draw-offs necessitated by changed relationships in densities and proportions of reactants and the reaction products and the like. Such changes may be made by those skilled in the art without departing from the scope of this invention.

This invention has been disclosed with respect to certain preferred embodiments, and various modifications and variations thereof will become obvious to persons skilled in the art. It is to be understood that such modifications and variations are to be included within the spirit and purview of this application and the scope of the appended claims.

What we claim is:

1. A process for the continuous production of sulfuric acid and gaseous hydrogen chloride, which comprises continuously feeding into a reaction zone, which is at such a temperature and pressure as to maintain the reaction medium therein in liquid state, chlorine, a liquid mixture of sulfur and sulfur monochloride, and water at a rate approximating its rate of reaction with said chlorine, sulfur, and sulfur monochloride, and continuously removing gaseous hydrogen chloride and a member of the group consisting of sulfuric and chlorosulfonic acids from the reaction mixture.

2. A process for the continuous production of sulfuric acid and gaseous hydrogen chloride, which comprises continuously feeding into a reaction zone, which is at such a temperature and pressure as to maintain the reaction medium therein in liquid state, chlorine, a liquid mixture of sulfur and sulfur monochloride, and water at a rate approximating its rate of reaction with said chlorine, sulfur, and sulfur monochloride, removing and admixing the effluent gaseous hydrogen chloride with a liquid mixture of sulfur and sulfur monochloride, and feeding the resulting liquid mixture of sulfur and sulfur monochloride into said reaction zone.

3. A process for the continuous production of sulfuric acid and gaseous hydrogen chloride, which comprises continuously feeding into a reaction zone, which is at such a temperature and pressure as to maintain the reaction medium therein in liquid state, chlorine, a liquid mixture of sulfur and sulfur monochloride, and aqueous sulfuric acid at a rate approximating its rate of reaction with said chlorine, sulfur, and sulfur monochloride, and continuously removing gaseous hydrogen chloride and a member of the group consisting of sulfuric and chlorosulfonic acids from the reaction mixture.

4. A process for the continuous production of sulfuric acid and gaseous hydrogen chloride, which comprises continuously feeding into a reaction zone, which is at such a temperature and pressure as to maintain the reaction medium therein in liquid state, chlorine, a liquid mixture of sulfur and sulfur monochloride, and aqueous sulfuric acid at a rate approximating its rate of reaction with said chlorine, sulfur, and sulfur monochloride, removing and admixing the effluent gaseous hydrogen chloride with a liquid mixture of sulfur and sulfur monochloride, and feeding the resulting liquid mixture of sulfur and sulfur monochloride into said reaction zone.

5. A process for the continous production of sulfuric acid and gaseous hydrogen chloride, which comprises continuously feeding into a reaction zone, which is at such a temperature and pressure as to maintain the reaction medium therein in liquid state, chlorine, a liquid mixture of sulfur and sulfur monochloride, and a member of the group consisting of water, aqueous hydrogen chloride, and aqueous sulfuric acid at a rate approximating its rate of reaction with said chlorine, sulfur, and sulfur monochloride, and continuously removing gaseous hydrogen chloride and a member of the group consisting of sulfuric and chlorosulfonic acids from the reaction mixture.

6. A process for the continuous production of sulfuric acid and gaseous hydrogen chloride, which comprises continuously feeding into a reaction zone, which is at such a temperature and pressure as to maintain the reaction medium therein in liquid state, chlorine, a liquid mixture of sulfur and sulfur monochloride, and a member of the group consisting of water, aqueous hydrogen chloride, and aqueous sulfuric acid at a rate approximating its rate of reaction with said chlorine, sulfur, and sulfur monochloride, removing and admixing the effluent gaseous hydrogen chloride with a liquid mixture of sulfur and sulfur monochloride, and feeding the resulting liquid mixture of sulfur and sulfur monochloride into said reaction zone.

References Cited in the file of this patent

UNITED STATES PATENTS

| | | |
|---|---|---|
| 804,515 | Askenasy et al. | Nov. 14, 1905 |
| 1,325,711 | Chaplin | Dec. 23, 1919 |
| 1,528,255 | McKee | Mar. 3, 1925 |
| 1,781,830 | Barstow | Nov. 18, 1950 |

FOREIGN PATENTS

| | | |
|---|---|---|
| 551,789 | Great Britain | Mar. 10, 1943 |
| 331,203 | Italy | Oct. 31, 1935 |

OTHER REFERENCES

J. W. Mellor's "A Comprehensive Treatise on Inorganic and Theoretical Chem.," vol. 2, 1922 ed., page 66, Longmans, Green and Company, New York.